United States Patent [19]

Weiss

[11] 4,356,983
[45] Nov. 2, 1982

[54] DEVICE FOR BRAKING WINDING CORES

[75] Inventor: Peter Weiss, Neuss, Fed. Rep. of Germany

[73] Assignee: Jagenberg Werke AG, Dusseldorf, Fed. Rep. of Germany

[21] Appl. No.: 190,529

[22] Filed: Sep. 24, 1980

[30] Foreign Application Priority Data

Sep. 27, 1979 [DE] Fed. Rep. of Germany ....... 2939202

[51] Int. Cl.$^3$ .............................................. B65H 23/06
[52] U.S. Cl. .................................. 242/75.4; 242/75.43
[58] Field of Search ................ 242/75.4, 75.43, 75.44, 242/75.45, 75.46

[56] References Cited
U.S. PATENT DOCUMENTS

| | | | |
|---|---|---|---|
| 2,900,143 | 8/1959 | Bandy | 242/75.44 |
| 2,965,326 | 12/1960 | Rockstrom | 242/75.43 |
| 3,240,058 | 3/1966 | Foster | 242/75.43 X |
| 3,330,457 | 7/1967 | Foster | 242/75.43 X |

*Primary Examiner*—Edward J. McCarthy
*Attorney, Agent, or Firm*—Sprung, Horn, Kramer & Woods

[57] ABSTRACT

A braking device for winding cores for webs of material to be unwound with varying web tension. The device includes a pressure medium actuated cylinder piston unit controlling brake shoes which act on the winding core trunnions. The cylinder-piston unit comprises at least two longitudinally aligned pistons having their axes coincident in the operating direction and abutting on each other in their rest positions. The pressure medium is applied to the pistons individually or in tandem to produce different braking forces.

4 Claims, 2 Drawing Figures

DEVICE FOR BRAKING WINDING CORES

BACKGROUND OF THE INVENTION

The invention relates to a device for braking winding cores for webs of material to be unwound with varying web tension by means of a pneumatic or hydraulic cylinder-piston unit actuating the brake shoes which act upon the chucking trunnions for the winding core.

It is known to brake cores wound with webs of material by means of pneumatic or hydraulic cylinder-piston units. The drive braking unit must in each case be adjusted to the tension to which the web is subject in unwinding. When during a change-over a winding core is inserted which has a web wound onto it that is then unwound with a tension differing from that for which the drive braking unit is designed, the latter must be replaced with one of proper strength. This is a nuisance, given the time required for modification and the number of brake units which must be stocked.

SUMMARY OF THE INVENTION

The object of the present invention is to provide a braking device which is constructed so as to permit winding cores to be braked with a braking force that is adjustable to the particular tension of the web wound onto the core.

This object is accomplished in a device of the type outlined above in that there are set into the cylinder-piston unit two or more pistons in a row, their axes coincident in the operating direction, which in the rest position abut on one another and which can be acted upon individually or as a unit by a pressure medium. The device in accordance with the invention thus makes it possible to apply pressure medium to just one of the pistons to generate a smaller braking force or, when a greater braking force is required, to apply pressure medium to two or more of the cascaded pistons so as to increase the braking force. In this way, a greater or smaller braking force may be exerted, in keeping with the particular web tension, without modification of the braking device.

In accordance with an advantageous embodiment of the device of the invention, the pistons may be of different sizes. In an arrangement with two pistons, three variations are then possible, namely, applying pressure medium to the smaller piston, to the larger piston, or simultaneously to both pistons, which permits the braking force to be increased in that order.

In accordance with a further advantageous embodiment of the device of the invention, provision is made for the pistons to be acted upon by pressure media from different sources, each piston then being capable of being subjected to pressure individually. However, pressure medium may also be applied to the pistons from a single source, in which case shutoff and/or switching means must be inserted in the pipes supplying the cylinders.

The cylinders may advantageously be constructed as diaphragm cylinders.

BRIEF DESCRIPTION OF THE DRAWINGS

The invention will now be described in greater detail with reference to the accompanying drawing, wherein.

DETAILED DESCRIPTION OF THE INVENTION

Figure 1:
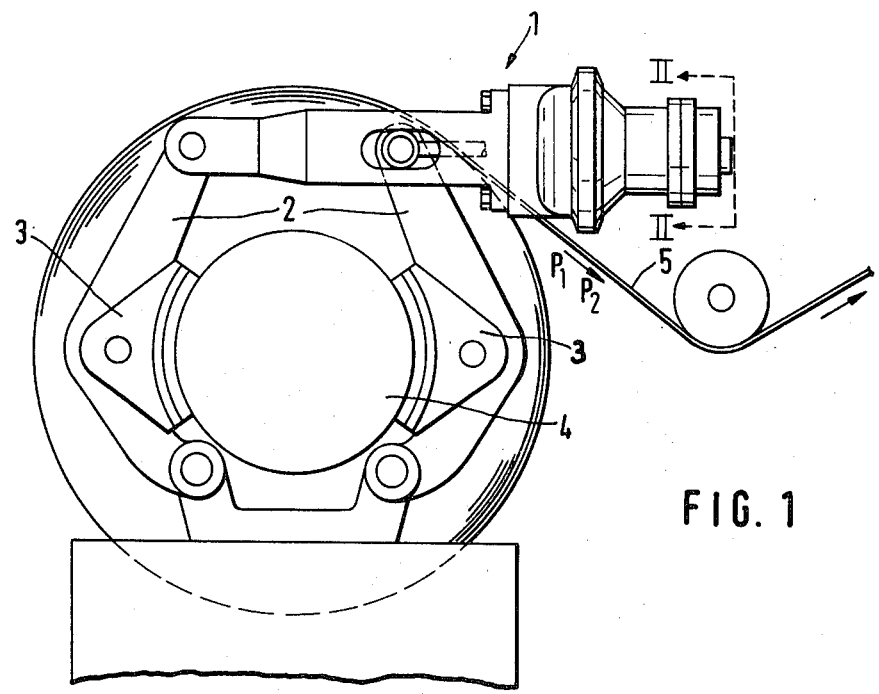
FIG. 1 is a diagrammatic representation of a braking device disposed on a winding core.

As shown in FIG. 1, the cylinder-piston unit 1 acts through levers 2 on the brake shoes 3 which engage the winding core 4 or its chucking trunnions so as to exert a braking force. The braking force is to be adapted to the particular tension $P_1$, $P_2$ and so forth to which the web 5 wound onto the winding core 4 is subject as it is being unwound.

Figure 2:
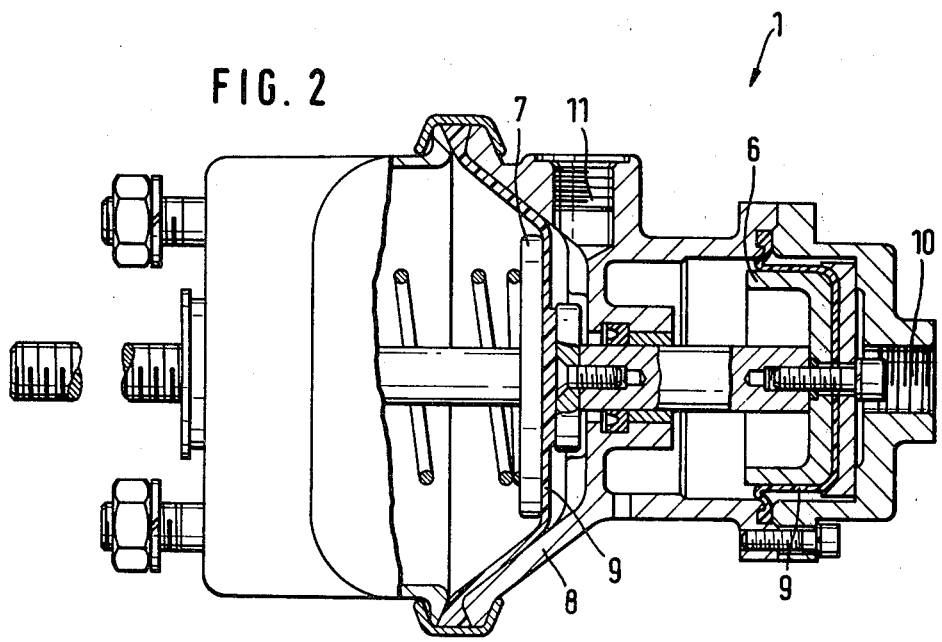
FIG. 2 is a partial cross section through line II—II of the braking device of FIG. 1 and having the characteristics of the invention.

As is apparent from the embodiment shown in FIG. 2, the cylinder-piston unit 1 which in accordance with the invention is constructed to satisfy the above condition comprises two pistons 6 and 7 which are arranged in a row, their axes coincident, and which are shown in their rest position abutting on each other, these pistons having different piston surfaces and being guided for axial movement in a cylinder housing 8, which in the embodiment illustrated is provided with diaphragms 9. Pressure medium from a common source or from separate sources can be introduced into the cylinder housing 8 through openings 10 and 11 therein to initiate a movement of the pistons 6 and 7 for exertion of a braking force.

When a relatively small braking force is to be exerted, pressure medium is applied only to the smaller piston 6, which during its axial displacement entrains the piston 7, which is not acted upon by pressure medium. When a somewhat greater braking force is to be exerted, pressure medium is admitted to the cylinder housing 8 to actuate the cylinder 7 for exertion of the braking force, with piston 6 then remaining in its rest position. If a still greater braking force is required, pressure medium is applied simultaneously to both pistons 6 and 7 in the cylinder housing 8, the forces exerted by them then being added for generation of a greater braking force.

It is obvious that by providing additional cylinder-piston units the possibilities of variation can be further increased to permit fine adjustment of the braking force.

It will be appreciated that the instant specification and claims are set forth by way of illustration and not of limitation, and that various changes and modifications may be made without departing from the spirit and scope of the present invention.

What is claimed is:

1. In a braking device for winding cores for webs of material to be unwound with varying web tension of the type having a pressure medium actuated cylinder-piston unit controlling brake shoes which act upon the chucking tensions for the winding core, the improvement wherein the cylinder-piston unit comprises a cylinder housing, at least two pistons, means mounting the pistons in longitudinal alignment in the housing with their axes coincident in the operating direction and abutting on each other in their rest positions and means for applying pressure medium to either piston individually and in tandem to obtain different braking forces.

2. A device according to claim 1, wherein the pistons have different surface areas.

3. A device according to claim 1 or claim 2, wherein the pressure medium applying means comprises means for applying pressure media to the pistons from different sources.

4. A device according to claim 1 or claim 2, wherein the mounting means comprises diaphragms for each piston disposed in the cylinder housing.

* * * * *